(12) United States Patent
Ju et al.

(10) Patent No.: US 8,515,076 B2
(45) Date of Patent: Aug. 20, 2013

(54) SECURITY SYSTEM AND METHOD USING AUTOMATIC METER READING PROTOCOL

(75) Inventors: Seong-Ho Ju, Daejeon (KR); Yong-Hoon Lim, Daejeon (KR); Jong-Mock Baek, Daejeon (KR); Moon-Suk Choi, Daejeon (KR); Young-Hyun Kim, Daejeon (KR); No-Gil Myoung, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 61 days.

(21) Appl. No.: 13/152,889

(22) Filed: Jun. 3, 2011

(65) Prior Publication Data
US 2012/0137350 A1 May 31, 2012

(30) Foreign Application Priority Data
Nov. 25, 2010 (KR) ........................ 10-2010-0118355

(51) Int. Cl.
*H04L 9/00* (2006.01)
(52) U.S. Cl.
USPC ....................................................... 380/277

(58) Field of Classification Search
USPC ................. 726/2, 6; 380/259, 262, 265, 277, 380/278; 713/171; 340/870.02
See application file for complete search history.

(56) References Cited

U.S. PATENT DOCUMENTS

2003/0081775 A1* 5/2003 Campagna et al. ............. 380/46
2010/0241848 A1* 9/2010 Smith et al. ................... 713/153

* cited by examiner

*Primary Examiner* — Ellen Tran
(74) *Attorney, Agent, or Firm* — McDermott Will & Emery LLP

(57) ABSTRACT

The present invention relates to a security system using an automatic meter reading protocol. The security system includes a Device Language Message Specification (DLMS) transmission unit for transmitting security DLMS data that includes security key update information and a first authentication value, and a DLMS reception unit for receiving the security DLMS data, searching the security key update information in the security DLMS data, and generating an updated security key using a second authentication value according to the security key update information. The security system can solve various problems occurring due to the operation of a separate security protocol, and can be easily implemented and managed.

15 Claims, 6 Drawing Sheets

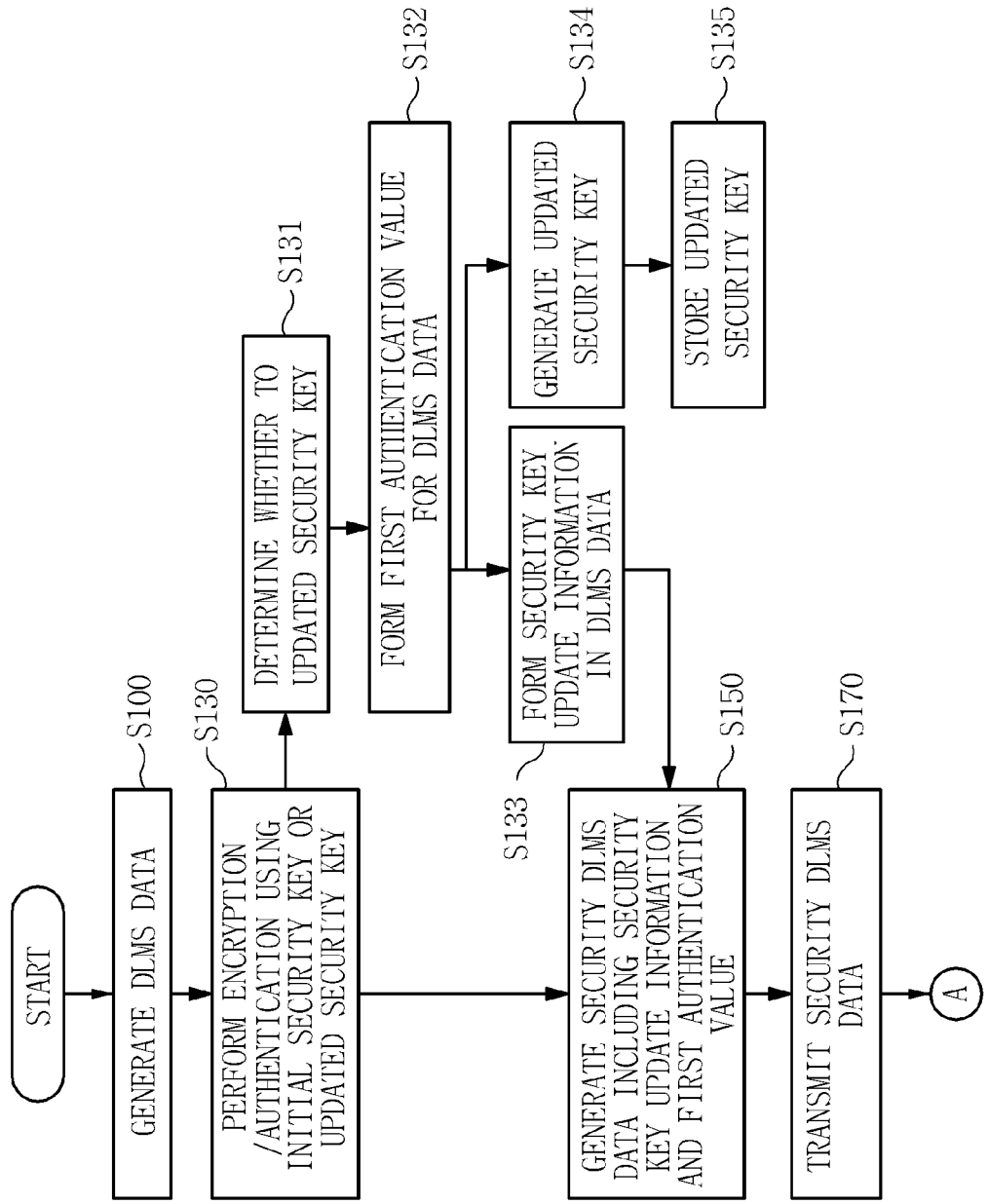

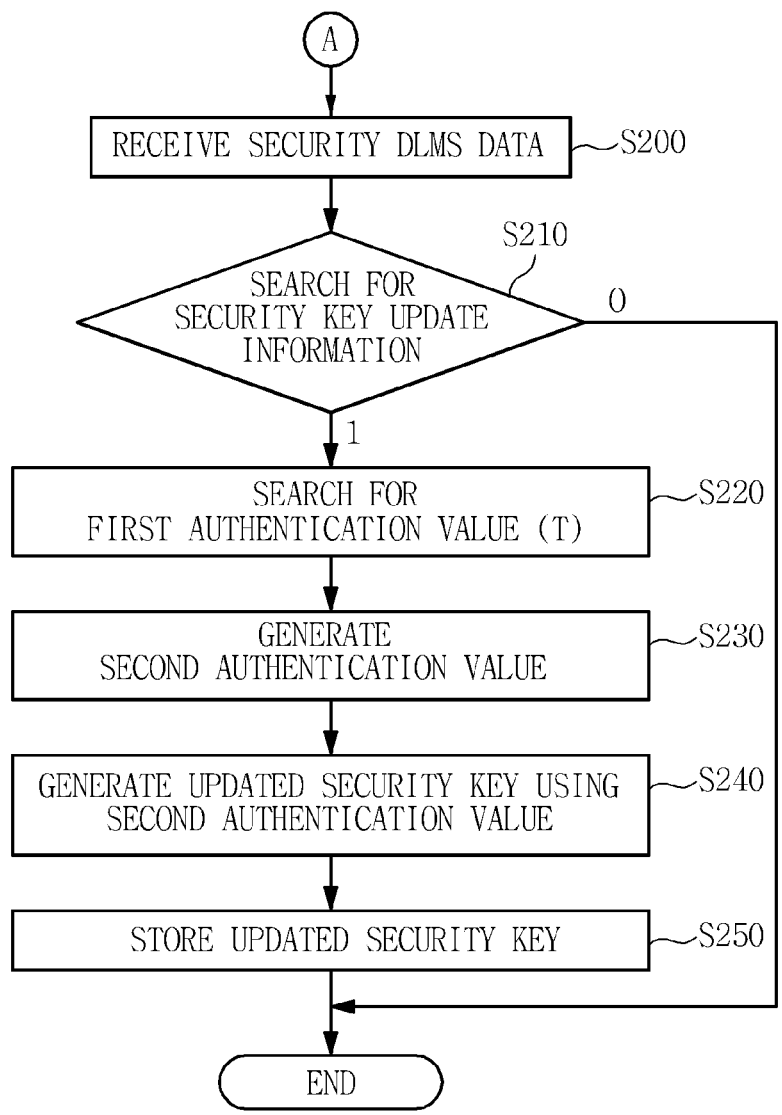

SECURITY SYSTEM AND METHOD USING AUTOMATIC METER READING PROTOCOL

CROSS REFERENCE TO RELATED APPLICATION

This application claims the benefit of Korean Patent Application No. 10-2010-0118355, filed on Nov. 25, 2010, which is hereby incorporated by reference in its entirety into this application.

BACKGROUND OF THE INVENTION

1. Technical Field

The present invention relates generally to a security system and method using an automatic meter reading protocol, and, more particularly, to a security system and method using an automatic meter reading protocol, which can solve various problems caused by the operation of a separate security protocol and can be easily implemented and managed.

2. Description of the Related Art

A Device Language Message Specification (DLMS) is an international communication protocol standard for automatic meter reading, which models various types of data treated by meters into logical objects for the purpose of acquiring mutual compatibility, defines data messages using the logical objects as standardized data structures, and prescribes transmission methods of transmitting the data messages to a variety of transmission media.

The DLMS international standard was initiated at International Electrotechnical Commission (IEC) 61107 (FLAG) and IEC 61334-4-41 (distribution line messaging specification), and the fields of use thereof have been widely extended to meter reading fields such as water or gas meter reading, as well as electricity meter reading.

Further, the term "automatic meter reading" refers to a method of reading meter data from individual electricity meters, gas meters, water meters or the like using a terminal at a remote place without a meterman having to personally visit the sites of the customers. The term "automatic meter reading system" refers to a system which automatically collects values indicated by meters, located at the remote place, and details detected by sensors through communication lines based on cables or radio waves, and aggregating or analyzing the collected values and details using a computer.

Such an automatic meter reading system collects information using a telephone line or a power line, or in a Radio Frequency (RF) manner. Further, the automatic meter reading system makes it possible to detect even demand patterns as well as to issue notices in conjunction with computer programs.

In such an automatic meter reading system, a security system for preparing against externally applied security attacks is regarded as a very significant consideration given the fact that the system provides important data that is used for billing for the amount of electricity or the like that is consumed.

In the prior art, separate security protocols which enable meter information to be protected using an authentication method between automatic meter reading devices, a security key management (generation, distribution, update and disposal) method, or the like, have been designed, and there have been presented measures for implementing such protocols.

However, an automatic meter reading and security system using the above prior art has problems such as the addition of security protocols required to generate and manage security keys, factors stemming from the operation of the separate security protocols, for example, an increase in network traffic, in the consumption of resources by devices and in overhead, an increase in device implementation cost stemming from the implementation of an additional security process, and the delay of meter reading stemming from the driving and communication of processes other than a pure meter reading process. Further, the automatic meter reading and security system also has non-negligible problems occurring in the actual implementation of the security system when the resource limitation conditions of a low-performance embedded device (a meter reading device such as a watt hour meter) are considered.

Further, when an automatic meter reading system is constructed, a network management system is additionally constructed for the purpose of efficient management, and power value added services such as integrated meter reading or load management, are added to the same automatic meter reading infrastructure, and thus there is a large concern that there could be an increase in the above-presented problems.

Therefore, a problem arises in that when separate security management protocols are operated, a periodic meter reading failure may be caused by the performance of additional tasks other than automatic meter reading, and this may act as a negative influence on the performance of automatic meter reading which is the original purpose.

Meanwhile, security protocols that have recently been defined by DLMS are divided into protocols for data access security and protocols for data transmission security. Those security protocols are designed such that for data access security, the security types of access to the information of a watt hour meter are divided into three types, that is, unlimited access (no security), low-level access (low-level security), and high-level access (high-level security) and such that for data transmission security, security types are divided into three types, that is, data encryption, data authentication, and data encryption authentication, with the result that the divided protocols are separately operated.

However, in security, the most significant problem to be solved is how to share security information (security keys) among devices. In the first security presented by DLMS, that is, data access security, even if the highest level security is applied, it is impossible to solve the problem of how to share security keys. Since this method enables authentication between devices to be performed using only a password and preset (externally exposed) information, problems may arise in that there are various types of security vulnerabilities, and even methods of sharing security information based on such authentication are not presented.

SUMMARY OF THE INVENTION

Accordingly, the present invention has been made keeping in mind the above problems occurring in the prior art, and an object of the present invention is to solve various problems caused by the operation of a separate security protocol, by generating and updating a security key using existing communication protocols for automatic meter reading.

Another object of the present invention is to provide a security system and method that can be easily managed, through a security system and method using an automatic meter reading protocol.

A further object of the present invention is to provide an effective and powerful security system and method, that can be easily implemented and can prepare against external security attacks on meter data.

In accordance with an aspect of the present invention, to accomplish the above objects, there is provided a security system using an automatic meter reading protocol, including a Device Language Message Specification (DLMS) transmission unit for transmitting security DLMS data that includes security key update information and a first authentication value, and a DLMS reception unit for receiving the security DLMS data, searching the security key update information in the security DLMS data, and generating an updated security key using a second authentication value according to the security key update information.

Preferably, the DLMS transmission unit includes a first security key update bit management unit for determining whether to update a security key and forming the security key update information in DLMS data, a first hash operation unit for generating the first authentication value for the DLMS data, a first data authentication value management unit for requesting the first hash operation unit to generate the first authentication value and receiving and managing the first authentication value, a security DLMS data generation unit for receiving both the security key update information and the first authentication value, and then generating security DLMS data, and a first data communication unit for transmitting the security DLMS data.

Preferably, the DLMS transmission unit may further include a first Linear Feedback Shift Register (LFSR) for generating the updated security key using the first authentication value according to determination made by the first security key update bit management unit about whether to update the security key, and a first security key management unit for managing and storing the updated security key generated by the first LFSR unit.

Preferably, the security DLMS data may be generated by applying an initial security key or the updated security key to DLMS data and then performing at least one of encryption or authentication on the DLMS data.

Preferably, the DLMS reception unit may include a second data communication unit for receiving the security DLMS data, a second security key update bit management unit for searching the security key update information in the received security DLMS data, and then determining whether to update a security key, a second hash operation unit for generating the second authentication value for the security DLMS data, a second data authentication value management unit for receiving the first authentication value, verifying validity of the first authentication value, and requesting the second hash operation unit to generate the second authentication value, and a second LFSR unit for generating the updated security key using the second authentication value.

Preferably, the DLMS reception unit may further include a second security key management unit for managing and storing the updated security key generated by the second LFSR unit.

Preferably, the second authentication value may be generated by performing a hash operation on the first authentication value, wherein the validity of the first authentication value has been verified.

In accordance with another aspect of the present invention to accomplish the above objects, there is provided a security method using an automatic meter reading protocol, including (a) transmitting a security Device Language Message Specification (DLMS) data that includes security key update information and a first authentication value, (b) receiving the security DLMS data, (c) searching the security key update information in the received security DLMS data, (d) generating a second authentication value for the security DLMS data, and (e) generating an updated security key using the second authentication value.

Preferably, (a) may include (a-1) generating a DLMS data, (a-2) applying an initial security key or the updated security key to the generated DLMS data and then performing at least one of encryption or authentication on the DLMS data, and (a-3) generating the security DLMS data that includes the security key update information and the first authentication value.

Preferably, (a-2) may include determining whether to update the security key, generating the first authentication value for the DLMS data, and forming the security key update information in the DLMS data.

Preferably, (a-2) may further include determining whether to update the security key, generating the first authentication value for the DLMS data, generating the updated security key using the first authentication value, and storing the updated security key.

Preferably, the security DLMS data may be generated by applying an initial security key or the updated security key to the DLMS data and then performing at least one of encryption or authentication on the DLMS data.

Preferably, (c) may include searching a security key update bit in the received security DLMS data, and searching for the first authentication value, and (e) may include managing and storing the generated updated security key.

Preferably, the second authentication value may be generated by performing a hash operation on the first authentication value, validity of the first authentication value has been verified.

Accordingly, the security system and method using an automatic meter reading protocol according to the present invention are advantageous in that security keys are generated and updated using existing communication protocols for automatic meter reading without operating separate security protocols, thus solving problems such as an increase in network traffic, resource consumption by devices, and overhead, which may occur due to the operation of the separate security protocols, and problems such as an increase in device implementation cost, which may occur due to the implementation of an additional security process.

Further, the security system and method using an automatic meter reading protocol according to the present invention is advantageous in that security keys are generated and updated using existing communication protocols for automatic meter reading, so that if necessary, security keys can be updated using ambient meter reading, and thus the management of security keys is facilitated.

Furthermore, the security system and method using an automatic meter reading protocol according to the present invention is advantageous in that an LFSR can be implemented using a simple circuit or simple software and uses a simple shift operation, thus preventing power consumption, various implementation problems, the delay of operation time, etc. from occurring.

Furthermore, the present invention is advantageous in that it provide an effective and powerful security system and method, which can prepare against external security attacks on important information such as the amount of electricity used that is read from a watt hour meter.

BRIEF DESCRIPTION OF THE DRAWINGS

The above and other objects, features and advantages of the present invention will be more clearly understood from the following detailed description taken in conjunction with the accompanying drawings, in which:

FIG. 7 is a flowchart sequentially showing the steps of a security method using an automatic meter reading protocol performed by the DLMS transmission unit according to an embodiment of the present invention; and FIG. 8 is a flowchart sequentially showing the steps of a security method using an automatic meter reading protocol performed by the DLMS reception unit according to an embodiment of the present invention.

DESCRIPTION OF THE PREFERRED EMBODIMENTS

Hereinafter, preferred embodiments of the present invention will be described in detail with reference to the attached drawings. However, the embodiments described below are provided to allow those skilled in the art to more easily understand the present invention and the scope of the present invention is not limited to the disclosed embodiments.

Hereinafter, an example to which a security system using an automatic meter reading protocol according to the present invention is applied will be described.

Figure 1:
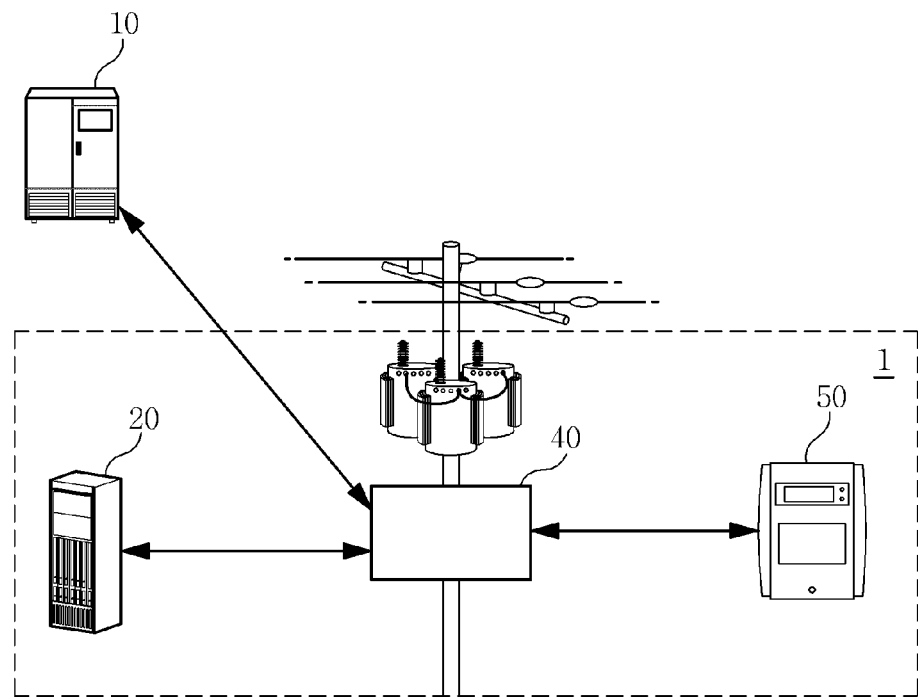
FIG. 1 is a diagram showing an example to which a security system using an automatic meter reading protocol according to the present invention is applied.

FIG. 1 illustrates an example to which a security system using an automatic meter reading protocol according to the present invention is applied. A security system 1 using an automatic meter reading protocol according to the present invention includes an authentication server 20, a data concentrator 40, and a watt hour meter 50, and is connected to an automatic meter reading server 10.

The security system 1 using an automatic meter reading protocol according to the present invention includes a DLMS transmission unit and a DLMS reception unit, and each of the authentication server 20, the data concentrator 40, and the watt hour meter 50 can be the DLMS transmission unit or the DLMS reception unit. However, depending on the characteristics of automatic meter reading, the watt hour meter 50 which transmits data measured by automatic meter reading may mainly be the DLMS transmission unit, and the data concentrator 40 which collects meter data may mainly be the DLMS reception unit.

The automatic meter reading server 10, the authentication server 20, the data concentrator 40, and the watt hour meter 50 of the security system 1 are connected over a network. Here, the network may be any type of network such as the Internet or a power line network.

The automatic meter reading server 10 functions to store and manage information about each customer, for example, the ID, customer name, address, etc. of the watt hour meter 50, and perform automatic meter reading in such a way as to collect and analyze meter data and provide billing data while being connected to the watt hour meter 50 via the data concentrator 40.

The automatic meter reading server 10 may include a database (DB) (not shown) for storing information about the Media Access Control (MAC) address and unique ID of the watt hour meter 50. However, the automatic meter reading server 10 of the present invention is not limited to this structure, and may be implemented as a separate DB server for storing the above information.

The authentication server 20 is connected to the watt hour meter 50 via the data concentrator 40 and then functions to authenticate both the data concentrator 40 and the watt hour meter 50.

The data concentrator 40 is connected to the watt hour meter 50 and is configured to primarily manage the watt hour meter 50 and collect meter data.

The data concentrator 40 is installed on an electric pole equipped with a transformer and is capable of mediating data communication between a plurality of watt hour meters 50, the automatic meter reading server 10, and the authentication server 20 which are connected to the data concentrator 40. Further, the data concentrator 40 transmits an authentication request received from a communication module provided in the data concentrator 40 or a relevant watt hour meter 50 to the authentication server 20 and to authenticate and register a relevant terminal depending on the results of authentication which are received from the authentication server 20 and indicate whether the relevant terminal has been authenticated.

The watt hour meter 50 includes a modem therein and transmits meter data, obtained by measuring the amount of electricity used by a relevant customer, to the automatic meter reading server 10 via the data concentrator 40 by using a communication method such as a power line communication method. In the present embodiment, a description is made on the basis of the construction in which the modem is included in the watt hour meter 50, but the present invention is not limited to such a construction, and the modem may be provided separately from the watt hour meter 50.

Although not shown in FIG. 1, a repeater (not shown) may be further included between the watt hour meter 50 and the data concentrator 40 so as to prevent the attenuation of data that is transmitted or received through a power line from occurring when the watt hour meter 50 and the data concentrator 40 are separated by a long distance.

The repeater functions to amplify the intensity of data, that is, a binarized signal, output from one of the watt hour meter 50 and the data concentrator 40 and transmit the amplified data to the other, thus preventing the attenuation of data The type and number of repeaters installed between the watt hour meter 50 and the data concentrator 40 are not especially limited.

The meter data measured by the watt hour meter 50 in this way undergoes at least one of encryption or authentication for security when communication with the data concentrator 40, the automatic meter reading server 10 or the authentication server 20 is performed.

Hereinafter, in the present specification, data which is obtained by converting the meter data into a data format for automatic meter reading to perform communication between the watt hour meter 50, the data concentrator 40, the automatic meter reading server 10, and the authentication server 20 is designated as 'DLMS data'. Further, data which is obtained by performing at least one of encryption or authentication on the DLMS data and then has encryption information and/or authentication information is designated as 'security DLMS data'.

Figure 2:
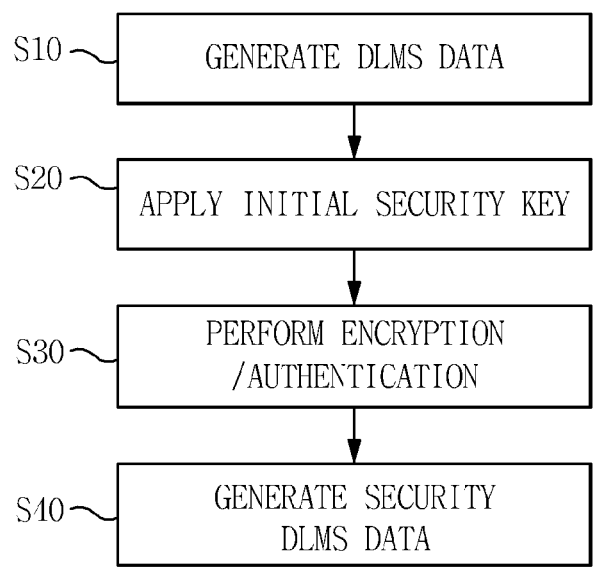
FIG. 2 is a block diagram briefly showing a process for generating security DLMS data from DLMS data.

Hereinafter, a process for generating security DLMS data by applying an initial security key to the DLMS data and then performing at least one of encryption or authentication on the DLMS data will be described with reference to FIG. 2.

Meter data measured by the watt hour meter 50 is converted into a data format for automatic meter reading, and thus DLMS data is generated at step S10.

An initial security key is applied to the generated DLMS data at step S20, and then at least one of encryption or authentication is performed at step S30. By means of this step, the DLMS data is encrypted, and authentication information is generated.

In this case, the term 'initial security key' denotes a temporary security key generated by the watt hour meter 50 combining initial information because a security key was not yet generated in the initial stage of installation of the watt hour meter 50, that is, at the beginning.

Here, the initial information may include both the address of the watt hour meter 50 which has been set by a manufacturing company when the watt hour meter 50 was manufactured, and a temporary key which has been set by an installer when the watt hour meter 50 was installed. The watt hour meter 50 may generate the initial security key by combining the address of the watt hour meter with the temporary key.

Further, the authentication server 20 can obtain the watt hour meter address/temporary key information based on the address and ID of the watt hour meter which have been provided by the manufacturing company when the watt hour meter 50 is delivered, and the temporary key and ID of the watt hour meter which have been presented by the installer after the installation of the watt hour meter has been completed, and provides the watt hour meter address/temporary key information to the data concentrator 40.

The data concentrator 40 can generate an initial security key to be initially used by each watt hour meter 50 using the received watt hour meter address/temporary key.

By means of this procedure, the watt hour meter 50 and the data concentrator 40 share the initial security key with each other.

It is apparent that, in addition to the above method, various well-known methods related to a method of generating the initial security key and a method of sharing the security key may be used.

Meanwhile, the watt hour meter 50 performs at least one of encryption or authentication according to the type of DLMS data, and thus generates, from the DLMS data, security DLMS data which includes a tag (Tag) required to determine the type of data, the length (Len) of the entire DLMS data, a security header (SH), and an authentication value (T) indicative of the results of the performance of authentication at step S40.

Here, the term "encryption" means that DLMS data is encrypted, wherein the DLMS data is encrypted using an encryption algorithm previously installed in the watt hour meter 50, for example, an Advanced Encryption Standard (AES) algorithm, an Academy, Research Institute, and Agency (ARIA) algorithm or the like.

Further, the term "authentication" means that an output value relative to the DLMS data (data digest, hereinafter referred to as an "authentication value") is generated using a hash algorithm previously installed in the watt hour meter 50, for example, MD-5, SHA-1, SHA-2, SHA256, or the like, wherein the authentication value generated in this way is attached to the DLMS data.

The term "encryption authentication" means that both encryption and authentication are performed to protect DLMS data. Such encryption/authentication is performed, and thus the security DLMS data is generated at step S40. This security DLMS data includes information about whether encryption/authentication has been performed, an authentication value, and security update information.

Hereinafter, the structure of the frame of security DLMS data, generated from DLMS data to include encryption/authentication performance information and security update information, will be described in detail with reference to FIG. 3.

Figure 3:
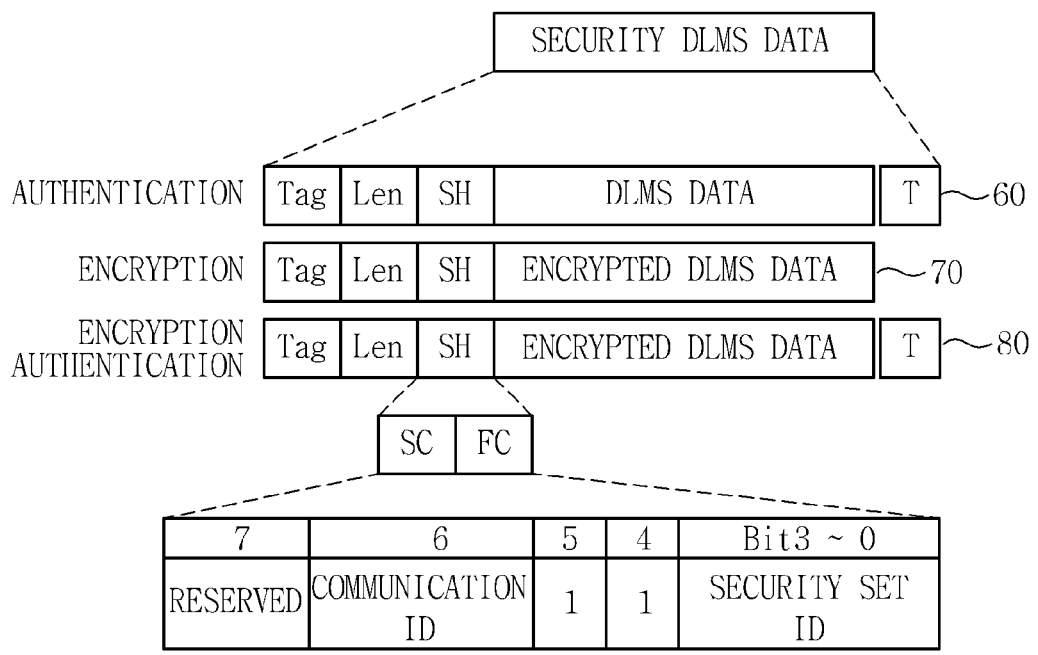
FIG. 3 is a diagram showing the structure of the frame of security DLMS data.

FIG. 3 is a diagram showing the structure of the frame of security DLMS data.

Referring to FIG. 3, security DLMS data 60 generated by performing authentication, security DLMS data 70 generated by performing encryption, and security DLMS data 80 generated by performing encryption authentication are individually shown.

First, the security DLMS data 60 generated by performing authentication includes an authentication value (denoted by "T") generated as a result of the performance of authentication. The security DLMS data 70 generated by performing encryption includes encrypted DLMS data. The security DLMS data 80 generated by performing encryption authentication includes both an authentication value and encrypted DLMS data.

Each of the security DLMS data 60, 70 and 80 further includes a tag (Tag) required to determine the type of data, the length (Len) of the entire DLMS data, and a security header (SH). The security header (SH) is subdivided into a security controller (SC) and a frame counter (FC).

The frame counter (FC) is the DLMS's own counter defined by the DLMS. The present invention uses the security counter (SC).

The Most Significant Bit (MSB) 7 of the security controller (SC) originally remains as a reserved bit in typical DLMS data, but can be used as a security key update information bit and can be transmitted with security key update information loaded into the security key update information bit in the present invention.

That is, when the security DLMS data is transmitted with the reserved bit set to '1', the DLMS reception unit updates its security key, whereas when the security DLMS data is transmitted with the reserved bit set to '0', the DLMS reception unit does not update its security key.

In the security controller (SC), bit 5 and bit 4 indicate whether encryption has been performed and whether authentication has been performed, respectively. When encryption and authentication are performed on DLMS data, respective bits 4 and 5 are individually represented as '1', whereas when encryption and authentication are not performed, they are individually represented as '0'.

Figure 4:
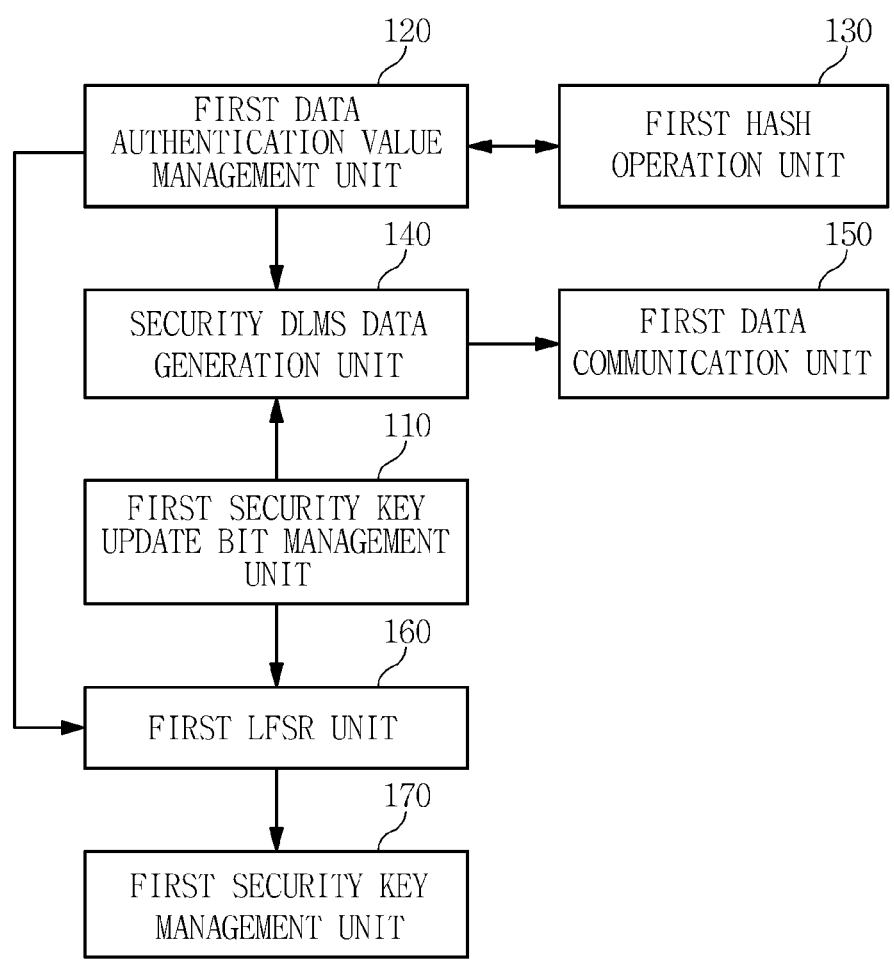
FIG. 4 is a block diagram showing the construction of the DLMS transmission unit of the security system using an automatic meter reading protocol according to the present invention.

Hereinafter, the security system using an automatic meter reading protocol according to an embodiment of the present invention will be described in detail with reference to FIGS. 4 to 6.

The security system using an automatic meter reading protocol according to the present invention includes a DLMS transmission unit and a DLMS reception unit. FIG. 4 is a block diagram showing the construction of the DLMS transmission unit, FIG. 5 is a diagram showing in detail the construction of the first LFSR unit of the DLMS transmission unit, and FIG. 6 is a block diagram showing the construction of the DLMS reception unit.

First, in the security system using an automatic meter reading protocol according to the present invention, the DLMS transmission unit is described below with reference to FIG. 4. The DLMS transmission unit may include a first security key update bit management unit 110, a first hash operation unit 130, a first data authentication value management unit 120, a security DLMS data generation unit 140, and a first data communication unit 150.

The first security key update bit management unit 110 determines whether to update a security key, and then forms security key update information in DLMS data.

That is, the first security key update bit management unit 110 determines whether to update the security key, sets the MSB 7 of the security controller (SC) of the frame of the DLMS data as '1' if it is determined that the security key needs to be updated, and sets the MSB 7 as '0' if it is determined that the security key does not need to be updated.

The first hash operation unit 130 performs authentication on the DLMS data, and generates a first authentication value as a result of the authentication. The first data authentication value management unit 120 requests the first hash operation unit 130 to generate the first authentication value, receives the generated first authentication value from the first hash operation unit 130, and manages the first authentication value.

The security DLMS data generation unit 140 receives the security key update information and the first authentication value from the first security key update bit management unit 110 and the first data authentication value management unit 120, respectively, and then generates security DLMS data.

In this case, the security DLMS data generation unit 140 generates the security DLMS data by applying the initial security key or the updated security key to the DLMS data and then performing at least one of encryption or authentication on the DLMS data.

The first data communication unit 150 transmits the generated security DLMS data to the DLMS reception unit which will be described later, the security DLMS data being transmitted using various communication methods based on wired/wireless communication.

In the security system using an automatic meter reading protocol according to the present invention, the DLMS transmission unit may further include a first Linear Feedback Shift Register (LFSR) unit 160 and a first security key management unit 170. The first LFSR unit 160 generates an updated security key using the first authentication value according to the determination made by the first security key update bit management unit 110 about whether to update the security key. The first security key management unit 170 manages and stores the updated security key generated by the first LFSR unit 160.

Figure 5:
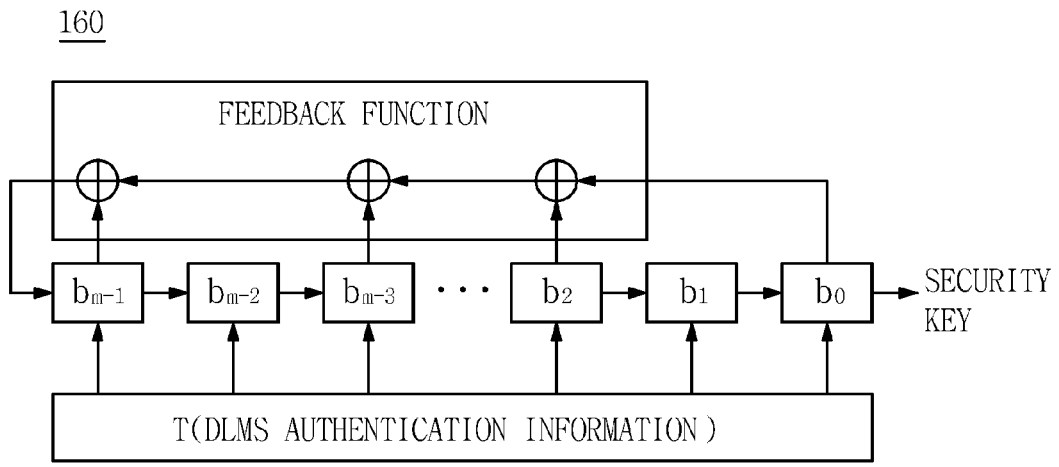
FIG. 5 is a diagram showing in detail the construction of the LFSR unit of the DLMS transmission unit or a DLMS reception unit.
Figure 6:
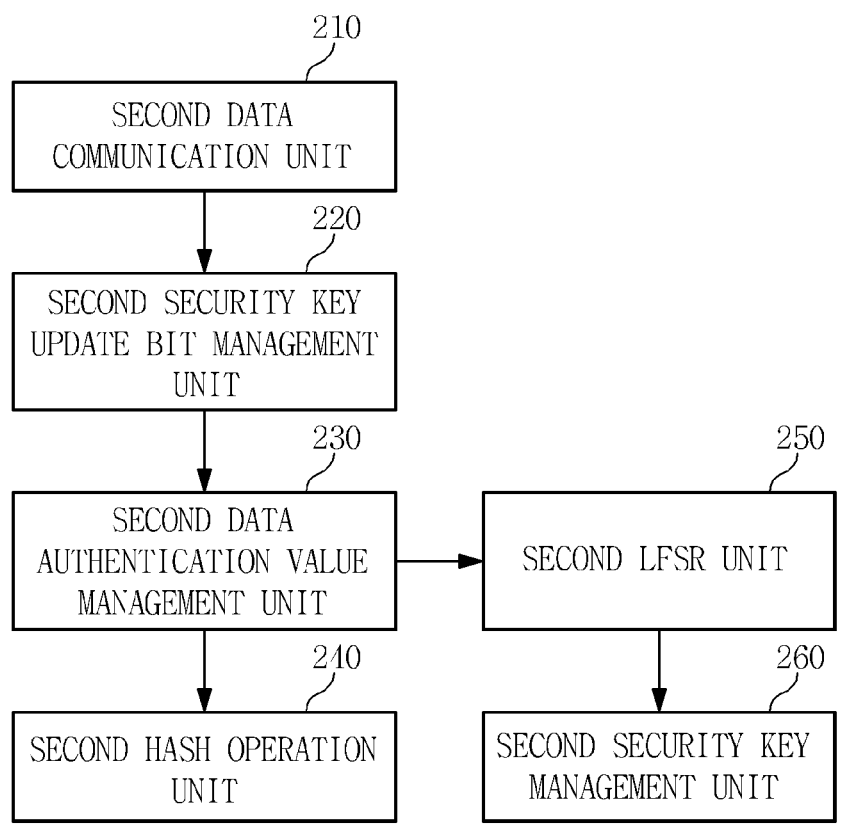
FIG. 6 is a block diagram showing the construction of the DLMS reception unit of the security system using an automatic meter reading protocol according to the present invention.

FIG. 5 is a diagram showing in detail the construction of the first LFSR unit 160 of the DLMS transmission unit. The first LFSR unit 160 denotes a linear feedback shift register.

The first LFSR unit 160 linearly connects a number of registers corresponding to the preset number of bits, and selects and configures a feedback function capable of inducing the generation of a random number. The first LFSR unit 160 generates an output value using both the feedback function and register values. In this case, the first authentication value generated by the first hash operation unit 130 using a hash algorithm is received from the first data authentication value management unit 120 and is then used as the input value of the registers.

The first authentication value must have a magnitude identical to the number of registers as occasion demands. In this case, the first authentication value must have a magnitude identical to the size of the initial security key or the updated security key. Therefore, a hash function needs only to be selected and defined so that a first authentication value, the magnitude of which is identical to the size of the initial security key or the updated security key, is generated.

For example, if it is assumed that AES-128 is used as the encryption algorithm, and SHA-256 is used as the hash algorithm, the first authentication value will be a 256-bit value, and the number of registers of the first LFSR unit 160 and the security key or the updated security key will have a size of 128 bits.

Therefore, only upper 128 bits of the first authentication value can be selected and used as the register input value.

As the feedback function, a function suitable for a size of 128 bits may be selected from among a variety of functions, the stability of which has been verified in security, and may be used. In this example, m of FIG. 5 is 128. When the configuration of FIG. 5 is represented by the feedback function, it may be given by $x^{127}+x^{125}+x^2$.

Finally, the 128-bit result value, obtained by operating the first LFSR unit 160 (when AES-128 is used as described above), is used as the initial security key or the updated security key.

Next, the DLMS reception unit of the security system using an automatic meter reading protocol according to the present invention will be described with reference to FIG. 6. The DLMS reception unit may include a second data communication unit 210, a second security key update bit management unit 220, a second hash operation unit 240, a second data authentication value management unit 230, and a second LFSR unit 250.

The second data communication unit 210 receives security DLMS data from the DLMS transmission unit. The second security key update bit management unit 220 searches the security key update information in the received security DLMS data, and then determines whether to update a security key.

That is, the second security key update bit management unit 220 updates the security key when the MSB 7 of the security controller (SC) of the frame of the security DLMS data is '1', and does not update the security key when the MSB 7 of SC is '0'.

The second data authentication value management unit 230 verifies the validity of the first authentication value included in the security DLMS data received from the DLMS transmission unit. After the validity has been verified, the second data authentication value management unit 230 requests the second hash operation unit 240 to generate a second authentication value.

That is, the second authentication value is generated by performing the hash operation on the first authentication value, the validity of the first authentication value has been verified, and is generated by the second hash operation unit 240 using a hash algorithm.

The second LFSR unit 250 denotes a linear feedback shift register similarly to the first LFSR unit 160 of the DLMS transmission unit. Since the second LFSR unit 250 has the same construction as the first LFSR unit 160 and performs a function similar to that of the first LFSR unit 160, a detailed description of the second LFSR unit 250 except for the differences with the first LFSR unit 160 is omitted.

The second LFSR unit 250 generates an updated security key by using the second authentication value, generated based on the hash algorithm by the second hash operation unit 240, as the input value of the registers.

The second authentication value must have a magnitude identical to the number of registers as occasion demands. In this case, since the second authentication value must have a magnitude identical to the size of the initial security key or the updated security key, a hash function needs only to be selected and defined so that a second authentication value, the magnitude of which is identical to the size of the initial security key or the updated security key, is generated.

Further, a result value which is finally output by operating the second LFSR unit 250 is used as the updated security key.

Further, in the security system using an automatic meter reading protocol according to the present invention, the DLMS reception unit may further include a second security key management unit 260. The second security key management unit 260 may manage and store the updated security key generated by the second LFSR unit 250.

Hereinafter, a security method using an automatic meter reading protocol according to an embodiment of the present invention will be described in detail with reference to FIGS. 7 and 8.

FIG. 7 is a flowchart sequentially showing the steps of a security method using an automatic meter reading protocol performed by the DLMS transmission unit according to an embodiment of the present invention, and FIG. 8 is a flowchart sequentially showing the steps of the security method using an automatic meter reading protocol performed by the DLMS reception unit according to an embodiment of the present invention.

Referring to FIG. 7, meter data measured by a watt hour meter 50 is converted into a data format for automatic meter reading, and then DLMS data is generated at step S100.

Next, an initial security key or an updated security key is applied to the generated DLMS data and at least one of encryption or authentication is then performed on the DLMS data at step S130. By means of this step, the DLMS data is encrypted and authentication information is generated.

In this case, the initial security key refers to a temporary security key generated by the watt hour meter 50 combining initial information because a security key was not generated in the initial stage of installation of the watt hour meter 50, that is, at the beginning. The updated security key refers to a security key which has already been updated by the security system using an automatic meter reading protocol according to the present invention.

The updated security key at this time may be either a security key obtained by updating the initial security key or a security key obtained by updating the updated security key one more time.

The procedure for performing encryption and authentication will be described in detail below. First, whether to update a current security key (this may be an initial security key or an updated security key) is determined at step S131.

Then, authentication is performed on the DLMS data, and thus a first authentication value for the DLMS data is formed as a result of the authentication at step S132. In addition, encryption is performed on the DLMS data, and thus encrypted DLMS data is formed.

Next, the results of the determination of whether to update the security key, that is, security key update information, may be formed in the DLMS data at step S133. If it is determined that the security key needs to be updated, the MSB 7 of the security controller (SC) of the frame of the DLMS data is set as '1'. In contrast, if it is determined that the security key does not need to be updated, the MSB 7 is set as '0'.

Further, an updated security key is generated using the formed first authentication value at step S134, and is stored at step S135. Here, the first authentication value may be formed using various types of hash algorithms, and the updated security key is generated by the LFSR using the first authentication value as an input value.

After the security key update information has been formed in the DLMS data, security DLMS data including the security key update information and the first authentication value is finally generated at step S150. This security DLMS data is generated by applying the initial security key or the updated security key to the DLMS data and then performing encryption or authentication on the DLMS data.

Thereafter, security DLMS data including both the security key update information and the first authentication value is transmitted to the DLMS reception unit using various communication methods based on wired/wireless communication at step S170.

Next, a security method using an automatic meter reading protocol, which is performed by the DLMS reception unit, will be described with reference to FIG. 8. First, security DLMS data including security key update information and a first authentication value is received from the DLMS transmission unit at step S200.

The security key update information is searched for in the received security DLMS data at step S210, and then whether to update a security key is determined.

That is, when the MSB 7 of the security controller (SC) of the frame of the security DLMS data is '1', the process proceeds to a subsequent step so as to update the security key, whereas when the MSB 7 is '0', the security key is not updated, and the process is terminated.

Then, the first authentication value is searched for in the security DLMS data received from the DLMS transmission unit at step S220, and the validity of the first authentication value is verified. After the validity has been verified, a second authentication value is generated by performing the hash operation on the first authentication value using a hash algorithm at step S230.

Therefore, an updated security key is generated by using the second authentication value as the input value of the LFSR at step S240, and is then stored at step S250.

As described above, the security system and method using an automatic meter reading protocol according to the present invention is advantageous in that security keys are generated and updated using existing communication protocols for automatic meter reading without operating separate security protocols, thus solving problems such as an increase in network traffic, resource consumption by devices, and overhead, which may occur due to the operation of the separate security protocols, and problems such as an increase in the cost of device implementation, which may occur due to the implementation of an additional security process.

Further, the present invention is advantageous in that security keys are generated and updated using existing communication protocols for automatic meter reading, so that if necessary, security keys can be updated using ambient meter reading, and thus the management of security keys is facilitated.

Furthermore, the security system using an automatic meter reading protocol according to the present invention is advantageous in that an LFSR can be implemented using a simple circuit or simple software and uses a simple shift operation, thus preventing power consumption, various implementation problems, the delay of operation time, etc. from occurring.

Furthermore, the present invention can provide an effective and powerful security system and method, which can prepare against external security attacks on important information such as the amount of electricity used that is read from a watt hour meter.

Although the preferred embodiments of the present invention have been disclosed for illustrative purposes, those skilled in the art will appreciate that various modifications, additions and substitutions are possible, without departing from the scope and spirit of the invention. Therefore, the embodiments described in the present invention are not intended to limit the spirit of the present invention, and are merely intended to describe the present invention. The spirit of the present invention is not limited by those embodiments. The scope of the present invention should be defined by the accompanying claims and all technical spirits of equivalents thereof should be interpreted as being included in the scope of the present invention.

What is claimed is:

1. A security system using an automatic meter reading protocol, comprising:
 a Device Language Message Specification (DLMS) transmission unit for transmitting security DLMS data that includes security key update information and a first authentication value; and
 a DLMS reception unit for receiving the security DLMS data, searching the security key update information in the security DLMS data, and generating an updated security key using a second authentication value according to the security key update information,
 wherein the security DLMS data is generated by applying an initial security key to DLMS data and then performing at least one of encryption or authentication on the DLMS data, and
 wherein the initial security key is generated by combining the address of a watt hour meter and a temporary key which has been set by an installer when the watt hour meter was installed.

2. The security system of claim 1, wherein the DLMS transmission unit comprises:
 a first security key update bit management unit for determining whether to update a security key and forming the security key update information in DLMS data;
 a first hash operation unit for generating the first authentication value for the DLMS data;
 a first data authentication value management unit for requesting the first hash operation unit to generate the first authentication value and receiving and managing the first authentication value;
 a security DLMS data generation unit for receiving both the security key update information and the first authentication value, and then generating security DLMS data; and
 a first data communication unit for transmitting the security DLMS data.

3. The security system of claim 2, wherein the DLMS transmission unit further comprises:
 a first Linear Feedback Shift Register (LFSR) for generating the updated security key using the first authentication value according to determination made by the first security key update bit management unit about whether to update the security key; and
 a first security key management unit for managing and storing the updated security key generated by the first LFSR unit.

4. The security system of claim 1, wherein the security DLMS data is generated by applying the updated security key to DLMS data and then performing at least one of encryption or authentication on the DLMS data.

5. The security system of claim 1, wherein the DLMS reception unit comprises:
 a second data communication unit for receiving the security DLMS data;
 a second security key update bit management unit for searching the security key update information in the received security DLMS data, and then determining whether to update a security key;
 a second hash, operation unit for generating the second authentication value for the security DLMS data;
 a second data authentication value management unit for receiving the first authentication value, verifying validity of the first authentication value, and requesting the second hash operation unit to generate the second authentication value; and
 a second LFSR unit for generating the updated security key using the second authentication value.

6. The security system of claim 5, wherein the DLMS reception unit further comprises:
 a second security key management unit for managing and storing the updated security key generated by the second LFSR unit.

7. The security system of claim 5, wherein the second authentication value is generated by performing a hash operation on the first authentication value, wherein the validity of the first authentication value has been verified.

8. A security method using an automatic meter reading protocol, comprising:
 (a) transmitting a security Device Language Message Specification (DLMS) data that includes security key update information and a first authentication value;
 (b) receiving the security DLMS data;
 (c) searching the security key update information in the received security DLMS data;
 (d) generating a second authentication value for the security DLMS data; and
 (e) generating an updated security key using the second authentication value,
 wherein the security DLMS data is generated by applying an initial security key to DLMS data and then performing at least one of encryption or authentication on the DLMS data, and
 wherein the initial security key is generated by combining the address of a watt hour meter and a temporary key which has been set by an installer when the watt hour meter was installed.

9. The security method of claim 8, wherein (a) comprises:
 (a-1) generating a DLMS data;
 (a-2) applying an initial security key or the updated security key to the generated DLMS data and then performing at least one of encryption or authentication on the DLMS data; and
 (a-3) generating the security DLMS data that includes the security key update information and the first authentication value.

10. The security method of claim 9, wherein (a-2) comprises:
 determining whether to update the security key;
 generating the first authentication value for the DLMS data; and
 forming the security key update information in the DLMS data.

11. The security method of claim 9, wherein (a-2) further comprises:
 determining whether to update the security key;
 generating the first authentication value for the DLMS data;
 generating the updated security key using the first authentication value; and
 storing the updated security key.

12. The security method of claim 8, wherein the security DLMS data is generated by applying the updated security key to the DLMS data and then performing at least one of encryption or authentication on the DLMS data.

13. The security method of claim 8, wherein (c) comprises:
searching a security key update bit in the received security DLMS data; and
searching for the first authentication value.

14. The security method of claim 8, wherein (e) comprises:
managing and storing the generated updated security key.

15. The security method of claim 8, wherein the second authentication value is generated by performing a hash operation on the first authentication value, wherein validity of the first authentication value has been verified.

* * * * *